United States Patent Office 3,205,263
Patented Sept. 7, 1965

3,205,263
BICYCLIC CHLORO OXIMES
Harry A. Stansbury, Jr., and David T. Manning, South Charleston, W. Va., assignors to Union Carbide Corporation, a corporation of New York
No Drawing. Filed Sept. 22, 1961, Ser. No. 139,882
4 Claims. (Cl. 260—566)

This invention relates to novel bicyclic nitrosochlorides and isomeric chloro oxime derivatives thereof. More particularly, the invention relates to novel 2-chloro-3-nitrosobicyclo(2.2.1) heptanes and their isomeric chloro oximes.

The compounds of this invention may be represented by the general formula:

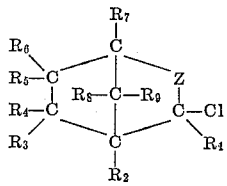

wherein Z is a divalent radical selected from the group consisting of

and C=NOH; $R_1$, $R_2$, $R_4$, $R_6$, $R_7$, $R_8$, and $R_9$ are selected from the group consisting of hydrogen and lower alkyl radicals; and $R_3$ and $R_5$ are selected from the group consisting of hydrogen, lower alkyl radicals, halogenated lower alkyl radicals, aryl radicals, lower alkylmercapto radicals, and lower alkoxy radicals.

The compounds of this invention may be classified into two groups: the nitrosochlorides, for which Z is

having the formula:

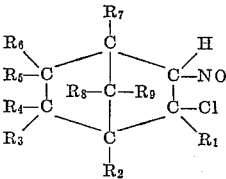

wherein the R radicals are defined as above; and their isomeric chloro oxime derivatives, for which Z is C=NOH, having the general formula

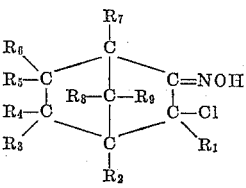

wherein the R radicals are defined as above.

Illustrative of the nitrosochlorides of this invention are 2-chloro-3-nitrosobicyclo(2.2.1) heptane,
2-chloro-5-methyl-3-nitrosobicyclo(2.2.1) heptane,
2-chloro-5,5-dimethyl-3-nitrosobicyclo(2.2.1) heptane,
2-chloro-2,6-dimethyl-3-nitrosobicyclo(2.2.1) heptane,
2-chloro-4,5-dimethyl-3-nitrosobicyclo(2.2.1) heptane,
2-chloro-5,6-dimethyl-3-nitrosobicyclo(2.2.1) heptane,
2-chloro-5,7-dimethyl-3-nitrosobicyclo(2.2.1) heptane,
2-chloro-5-ethyl-3-nitrobicyclo(2.2.1) heptane,
2-chloro-3-nitroso-5-propylbicyclo(2.2.1) heptane,
2-chloro-6-isopropyl-3-nitrosobicyclo(2.2.1) heptane,
5-butyl-2-chloro-3-nitrosobicyclo(2.2.1) heptane,
2-chloro-5-chloromethyl-3-nitrosobicyclo(2.2.1) heptane,
2-chloro-6-chloromethyl-1-methyl-3-nitrosobicyclo (2.2.1) heptane,
2-chloro-5-chloromethyl-2-methyl-3-nitrosobicyclo (2.2.1) heptane,
2-chloro-6-chloromethyl-4-methyl-3-nitrosobicyclo (2.2.1) heptane,
2-chloro-5-chloromethyl-6-methyl-3-nitrosobicyclo (2.2.1) heptane,
2-chloro-6-chloromethyl-7-methyl-3-nitrosobicyclo (2.2.1) heptane,
2-chloro-5-chloromethyl-3-nitrosobicyclo(2.2.1) heptane,
2-chloro-5-chloroethyl-3-nitrosobicyclo(2.2.1)heptane,
2-chloro-6-chloropropyl-3-nitrosobicyclo(2.2.1) heptane,
2-chloro-5-chloroisopropyl-3-nitrosobicyclo(2.2.1) heptane,
2-chloro-6-(chloro-n-butyl)-3-nitrosobicyclo(2.2.1) heptane,
2-chloro-3-nitroso-5-phenylbicyclo(2.2.1) heptane,
2-chloro-3-nitroso-4-methyl-6-phenylbicyclo(2.2.1) heptane,
2-chloro-2-methyl-3-nitroso-5-phenylbicyclo(2.2.1) heptane,
2-chloro-4-methyl-3-nitroso-6-phenylbicyclo(2.2.1) heptane,
2-chloro-5-methyl-3-nitroso-5-phenylbicyclo(2.2.1) heptane,
2-chloro-7-methyl-3-nitroso-6-phenylbicyclo(2.2.1) heptane,
2-chloro-5-methylmercapto-3-nitrosobicyclo(2.2.1) heptane,
2-chloro-6-ethylmercapto-3-nitrosobicyclo(2.2.1) heptane,
2-chloro-3-nitroso-5-n-propylmercaptobicyclo(2.2.1) heptane,
2-chloro-6-isopropylmercapto-3-nitrosobicyclo(2.2.1) heptane,
2-chloro-5-methyl-6-methylmercapto-3-nitrosobicyclo- (2.2.1)heptane,
2-chloro-5-methoxy-3-nitrosobicyclo(2.2.1)heptane,
2-chloro-6-ethoxy-3-nitrosobicyclo(2.2.1)heptane,
2-chloro-5-n-propoxy-3-nitrosobicyclo(2.2.1)heptane,
2-chloro-6-isopropoxy-3-nitrosobicyclo(2.2.1)heptane,
2-chloro-5-methoxy-6-methyl-3-nitrosobicyclo(2.2.1) heptane,
and the like.

Illustrative of the chloro oximes of this invention are the oxime isomers corresponding to the above-listed nitrosochlorides. For example, 2-chloro-3-nitrosobicyclo- (2.2.1)heptane corresponds to 3-chlorobicyclo(2.2.1) heptan-2-one oxime.

The synthesis of the nitrosochlorides of this invention from commercially available starting materials may be graphically depicted as follows, where the R radicals are defined as above:

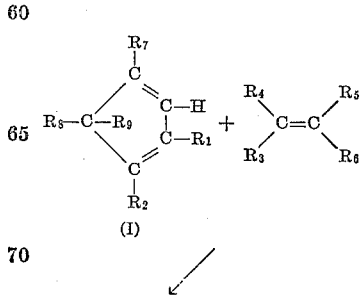

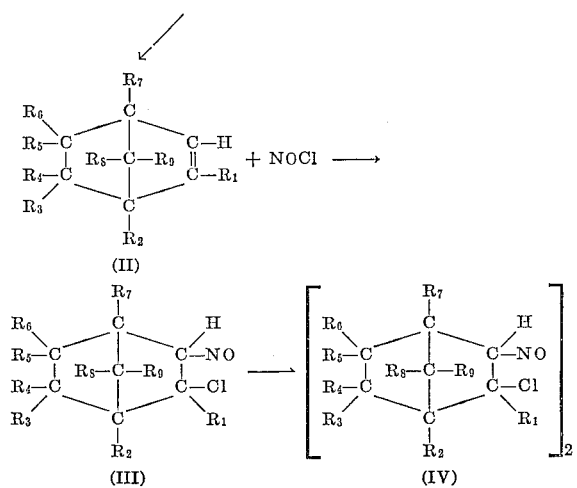

A suitably substituted cyclopentadiene (I) is reacted with a suitable substituted ethylene to form the bicyclo [2.2.1]-2-heptene (II) by the well-known Diels-Alder addition. Such an addition is conveniently carried out by heating the reactants under sufficient pressure to maintain them in the liquid phase.

The conversion of the heptenes (II) to the nitrosochlorides (IV) of the present invention is accomplished by means of a liquid-phase addition of nitrosyl chloride. Generally, the heptene (II) is dissolved in any inert organic solvent which is a liquid at the reaction temperature and nitrosyl chloride is slowly added, whereupon the dimeric nitrosochloride precipitates out. Illustrative of the solvents which may be employed in carrying out this reaction are aliphatic hydrocarbons or mixtures thereof, such as pentane, hexane, heptene, and petroleum ether, aromatic hydrocarbons such as toluene, xylene, and the like, chlorinated hydrocarbon, such as methylene dichloride, chloroform, and carbon tetrachloride; and aliphatic ethers having from four to ten carbon atoms, such as diethyl ether, diisopropyl ether, dibutyl ether, and the like. We prefer to use low-boiling chlorinated hydrocarbons, such as methylene dichloride and carbon tetrachloride.

Nitrosyl chloride is fed into the heptene-solvent solution in a mol ratio of nitrosyl chloride to the heptene of from about 0.25:1 to about 2:1. At ratios below 0.25:1 conversion is excessively low, while employing ratios about 2:1 results in undesirable side reactions, such as oxidation. A ratio of from about 0.75:1 to about 1.5:1 is preferred, while a ratio of from about 1.05:1 is most preferred. The addition of the nitrosyl chloride must be carried out carefully, as the reaction is exothermic and good temperature control must be maintained.

The reaction may be effected at temperatures between about −50° C. and about 25° C. (room temperature), and is preferably carried out between about −5° C. and about +5° C. The reaction proceeds very rapidly so that the reaction time is dependent primarily on the rate of addition of nitrosyl chloride which, in turn, is limited by the capacity of the cooling system to hold the temperature within the desired range. Feed periods ranging from 20 minutes to three hours may be successfully used. To insure completion of the reaction, the reaction mixture may be maintained at the reaction temperature for ten minutes to an hour following the feed period.

While the operating pressure can be varied broadly, the reaction is preferably effected at atmospheric pressure.

The nitrosochloride (IV) which precipitates out as a white solid during the course of the reaction, exists in the stable dimeric form, wherein two molecules are coupled through the nitroso radicals by an azodioxy linkage, which can be represented graphically as follows:

$$\begin{array}{c} O\ \ \ O \\ \uparrow\ \ \ \uparrow \\ -N=N- \end{array}$$

The precipitated product may be separated from the reaction mixture by techniques known to the art, for example, by filtration followed by washing and drying of the solid cake.

The chloro oxime compounds of this invention are prepared from the nitrosochlorides of this invention, which are prepared as set forth above, in a two-step reaction which may be graphically represented as follows, where the R radicals are defined as above:

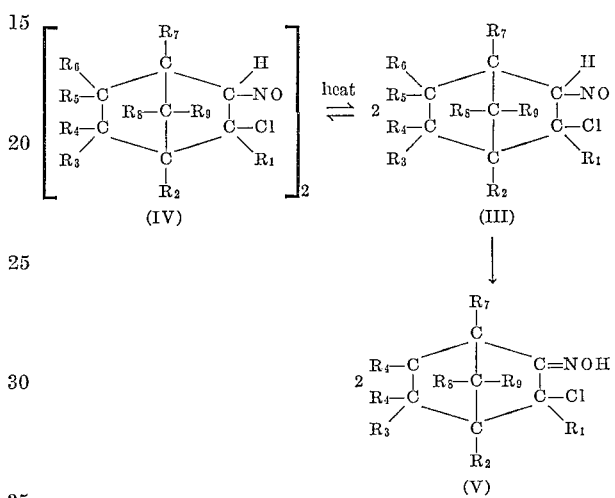

As can be seen from the equation, the rearrangement takes place in two steps: thermal dissociation of the table, dimeric form of the nitrosochloride (IV) to a relatively unstable blue-green monomeric form (III) followed by a thermal conversion to the chloro oxime (V). This two-step rearrangement may be effected in one operation by treating the dimeric nitrosochloride (IV) with a solvent and heating the resulting mixture to a temperature above 90° C., whereupon the monomeric form (III) is readily formed and also readily rearranged to the chloro oxime, which is soluble in the solvent used, and therefore is present in a dissolved state in the final reaction solution.

Illustrative of the solvents used in carrying out the rearrangement are saturated aliphatic alcohols such as methanol, ethanol, n-propanol, isopropanol, n-butanol, isobutanol, amyl alcohol, and the like. Also utilizable are glycols and polyhydroxy derivates such as ethylene glycol, glycerol, propylene glycol, ethylene glycol monoethyl ether, diethylene glycol monoethyl ether, dipropylene glycol, and the like. The use of n-butanol is preferred because its boiling point at atmospheric pressure (117.7° C.) lies at the preferred reaction temperature, thus facilitating the maintenance of the preferred temperature by simple refluxing.

The temperature at which the reaction may be conducted is from about 95° C. to about 180° C. with a temperature of 110–125° C. being preferred. At temperatures below 95° C. the dimeric nitrosochloride is insufficiently dissociated to give an acceptable reaction rate. Operating batchwise at temperatures above about 130° C. results in undesirable side reactions, for example, replacement of the chloride radical by an alkoxy radical. However, if particular provision is made to minimize the contact time, temperature above 130° C. up to 180° C. may be successfully employed. For example, forming a suspension of the nitrosochloride in the solvent, and passing such a suspension continuously and rapidly through a hot reaction zone can result in good yields.

The ratio of solvent to nitrosochloride may vary from about 3:1 to 15:1 by weight. At dilutions above 15:1 yields are small, whereas at ratios smaller than 3:1 the reaction temperature becomes difficult to control.

Reaction times may vary from a few seconds, where a continuous, high-temperature process is used, to about one hour for a low-temperature batch process. When carrying out the reaction batch-wise, the minimum time that should be used is about 5 minutes, and is preferably from 10 minutes to one-half hour. When operating at the preferred reaction temperature of 117–118° C. the most preferred reaction time is about fifteen minutes. At this temperature contact times of less than five minutes result in excessively low conversion while no advantage exists in maintaining this temperature for more than half an hour. Contact times greater than one hour are to be avoided in view of possible side reactions. The proper reaction time for any given reaction temperature may readily be determined by following the course of the reaction, i.e., noting the gradual consumption of the insoluble nitrosochloride dimer. At the end of the reaction of clear yellow solution obtains, indicating completion of the rearrangement.

While the operating pressure can be sub- or superatmospheric, the most convenient way to effect the reaction is by employing atmospheric pressure.

The chloro oxime product may be recovered from its solution by means known to the art. For example, vacuum-distilling the solution to remove the solvent, redissolving the residue in a suitable solvent such as ethyl ether, diluting the resulting ether solution with another solvent, such as pentane or cyclohexane, which tend to precipitate byproducts, treating with decolorizing charcoal, refiltering, and evaporating the solvent mixture, results in product of good purity.

Illustrative of the preparation of the compounds of this invention are Examples I–VII, hereinbelow.

EXAMPLE I.—PREPARATION OF 2-CHLORO-3 NITROSOBICYCLO(2.2.1)HEPTANE

*Experiment 1*

94.0 grams (1 mole) of bicyclo [2.2.1]-2-heptene were dissolved in 550 milliliters of carbon tetrachloride. To this solution were added, with stirring, 98 grams (1.5 moles) of nitrosyl chloride at a temperature of 3–6° C. After a feed period of 36 minutes, stirring was continued for 10 more minutes. A heavy white precipitate produced was separated from the pale blue-green solution by suction filtration. The crude filter cake was ground with cold methanol in a mortar and again collected by suction to give a white solid with a melting point of 149–150° C. The reaction flask was then rinsed with acetone, and the acetone removed from the resulting solution by evaporation on the steam bath to recover a small additional portion of product. The combined yield of 2-chloro-3-nitrosobicyclo(2.2.1) heptane dimer was 70.0 grams, or 44.5 percent of the theoretical. A small portion recrystallized from toluene gave white crystals with a melting point of 148–150° C.

| Analysis | C | H | N | Cl |
|---|---|---|---|---|
| Calculated | 52.67 | 6.31 | 8.78 | 22.21 |
| Found | 53.25 | 6.17 | 8.77 | 22.47 |

The structure was confirmed by infrared spectral analysis.

*Experiment 2*

2-chloro-3-nitrosobicyclo(2.2.1)heptane was prepared as in Experiment 1 except that only 1.1 mole of nitrosyl chloride was used. The dimer weighed 102 grams, corresponding to a yield of 64 percent of the theoretical.

*Experiment 3*

388 grams (4.13 moles) of bicyclo[2.2.1]-2-heptene were dissolved in 2800 milliliters of carbon tetrachloride. 278 gram (4.25 moles) of nitrosyl chloride were added, with stirring, over a period of 2 hours, while maintaining a reaction temperature of −4° to 0° C. The resulting precipitate was when treated as in Experiment 1. The yield weighed 479 grams corresponding to 72.8 percent of the theoretical. The melting point of the dimer was 140–141° C.

EXAMPLE II.—PREPARATION OF 2-CHLORO-5(6)-METHYL-3-NITROSOBICYCLO(2.2.1)HEPTANE 114 grams (1.054 moles) of 5-methylbicyclo [2.2.1]-2-heptene were dissolved in a mixture of 250 milliliters of ethyl ether and 250 milliliters of pentane. To this solution were added, with stirring, 66.7 grams (1.02 moles) of nitrosyl chloride while maintaining a reaction temperature of 8° C. After a feed period of 1.47 hours, the reaction mixture was stirred for another 3.5 hours and the resulting solid filtered off and dried. A small additional amount of product was obtained by reacting the filtrate with 14.2 grams of nitrosyl chloride and filtering off the solid. The combined dried dimer weight was 47.1 grams, corresponding to 25.7 percent of the theoretical. The melting point of the dimer recrystallized from toluene, was 146.5–150° C.

Analysis: N
Calculated _____ 8.07
Found _____ 8.82

Infrared spectral analysis confirmed the structure of the product.

EXAMPLE III.—PREPARATION OF 2-CHLORO-5(6)-CHLOROMETHYL-3-NITROSOBICYCLO(2.2.1)HEPTANE 86 grams (0.603 mole) of 5-chloromethylbicyclo [2,2.1]-2-heptene were dissolved in 350 milliliters of pentane. To this solution were added 39.3 grams (0.6 mole) of nitrosyl chloride, with stirring, while maintaining a reaction temperature of 4–5° C. After a feed period of 1 hour, stirring was continued for an additional 2.5 hours. The precipitated product was collected by filtration, washed with pentane, and dried. The dry dimer weighed 115.2 grams, corresponding to a yield of 92.2 percent of the theoretical. The melting point of the dimer, recrystallized from toluene, was 159–160° C.

| Analysis | C | H | N | Cl |
|---|---|---|---|---|
| Calculated | 46.17 | 5.33 | 6.73 | 34.08 |
| Found | 46.23 | 5.59 | 6.29 | 33.73 |

The structure was confirmed by infrared spectral analysis.

EXAMPLE IV.—PREPARATION OF 2-CHLORO-3-NITROSO-5(6)-PHENYLBICYCLO(2.2.1)HEPTANE 100 grams (0.587 mole) of 5-phenylbicyclo[2.2.1]-2-heptene were dissolved in 400 milliliters of pentane. To this solution were slowly added 42 grams (0.641 mole) of nitrosyl chloride, with stirring, while maintaining a reaction temperature of 5–6° C. Following a feed-period of 1 hour, stirring was continued for 2.5 hours. The precipitated white dimer was filtered off, washed twice with cold pentane, and dried. The weight of the yield was 128.8 grams, or 93.0 percent of the theoretical. The dimer, recrystalized from toluene, had a melting point of 179–179.5° C.

| Analysis | C | H | N | Cl |
|---|---|---|---|---|
| Calculated | 66.24 | 5.99 | 5.94 | 15.04 |
| Found | 66.29 | 6.16 | 5.85 | 14.25 |

EXAMPLE V.—PREPARATION OF 3-CHLOROBICYCLO(2.2.1)HEPTAN-2-ONE OXIME

Experiment 1

A suspension of 94.9 grams of 2-chloro-3-nitrosobicyclo(2.2.1)heptane dimer in 900 milliliters of n-butanol was refluxed at atmospheric pressure for 35 minutes. The solution became greenish-blue upon reaching the reflux temperature indicating the formation of monomeric nitrosochloride, and then faded through green to yellow. The solvent was removed by vacuum distillation leaving an amber-colored sirup. This sirup was dissolved in ethyl-ether, and the resulting solution was filtered. The ether was evaporated and the remaining solid was redissolved in hot hexane. This solution which was filtered while hot deposited crystals when cooled. These crystals were dissolved on ethyl acetate and recrystallized to give a white solid with melting point 105–107° C. The product weighed 70.2 grams, corresponding to a yield of 74 percent of the theoretical.

| Analysis | N | Cl |
|---|---|---|
| Calculated | 8.78 | 22.21 |
| Found | 8.96 | 21.86 |

The structure was confirmed by infrared spectral analysis.

Experiment 2

A suspension of 397 grams of 2-chloro-3-nitrosobicyclo(2.2.1)heptane dimer in 350 milliliters of n-butanol was heated quickly to refluxing, with stirring, at a temperature of 109–118° C. After a refluxing time of 22 minutes, the n-butanol solvent was removed by vacuum distillation. The residue was dissolved in 1766 grams of hot hexane, and the resulting solution upon cooling deposited an oil which crystallized upon standing to give 342 grams of crude 3-chlorobicyclo[2.2.1]heptan-2-one oxime, corresponding to a yield of 86.2 percent of the theoretical. Recrystallization of the crude product from ethyl acetate-petroleum ether gave partial separation into high- and low-melting geometrical isomers as follows:

| Fraction | Weight (grams) | Melting point |
|---|---|---|
| 1 | 103 | 100–103° |
| 2 | 78 | 94–101° |
| 3 | 50 | 63–77° |

The low-melting material (fraction 3) analyzed as follows:

|  | N | Cl |
|---|---|---|
| Calculated | 8.78 | 22.21 |
| Found | 8.87 | 22.27 |

Experiment 3

A suspension of 1288 grams (4.03 moles) of 2-chloro-3-nitrosobicyclo(2.2.1)heptane dimer in 13,800 milliliters of n-butanol was heated with vigorous stirring, to a temperature of 113–119° C., where it was held for approximately 15 minutes. After allowing the clear-yellow solution to cool, the n-butanol was removed by vacuum distillation. 3-chlorobicyclo[2.2.1]heptan-2-one oxime was recovered in quantitative yield as a clear sirup, pure enough for conversion to various derivatives.

EXAMPLE VI.—PREPARATION OF 3-CHLORO-5(6)-METHYLBICYCLO(2.2.1)HEPTAN-2-ONE OXIME

A suspension of 34.1 grams of 2-chloro-5(6)-methyl-3-nitrosobicyclo(2.2.1)heptane dimer in 300 milliliters of n-butanol was refluxed, at 117–118° C., for 26 minutes. The solution, now a dark yellow, was vacuum-distilled to leave 30.9 grams of a dark brown sirup. This sirup was taken up in 300 milliliters of ethyl ether and allowed to stand for one hour. The solution was then filtered and the filtrate diluted with 500 milliliters of pentane and treated with activated carbon. The resulting mixture was then filtered and vacuum-distilled to leave 26.7 grams of yellow sirup product, corresponding to a yield of 78.3 percent of the theoretical.

Analysis: N
Calculated _____ 8.07
Found _____ 8.72

Infrared analysis confirmed the structure.

EXAMPLE VII.—PREPARATION OF 3-CHLORO-5(6)-CHLOROMETHYLBICYCLO(2.2.1)HEPTAN-2-ONE OXIME

A suspension of 60 grams of 2-chloro-5(6)-chloromethyl-3-nitrosobicyclo(2.2.1)heptane dimer in 500 milliliters of n-butanol was heated under reflux, at 117° C. for 8 minutes. The solution was vacuum-distilled to dryness, leaving a 65 gram residue which was dissolved in 500 milliliters of ethyl ether and allowed to stand for 30 minutes. The solution was then filtered and the filtrate diluted with 470 milliliters of pentane and treated with decolorizing carbon. The resulting mixture was filtered and evaporated under reduced pressure to give 56.8 grams of yellow-brown sirup product, corresponding to a yield of 94.7 percent of the theoretical.

Analysis: N
Calculated _____ 6.73
Found _____ 6.42

EXAMPLE VIII.—PREPARATION OF 3-CHLORO-5(6)-PHENYLBICYCLO(2.2.1)HEPTAN-2-ONE OXIME

A suspension of 61.9 grams of 2-chloro-3-nitroso-5(6)-phenyl bicyclo(2.2.1)heptane dimer in 500 milliliters of n-butanol was heated under reflux, at 117° C. for 45 minutes. Little, if any, solution occurred at this point and some evolution of nitric oxide as a result of decomposition was apparent. The reaction mixture was allowed to cool to 100° C., 50 milliliters of N,N'-dimethylformamide were added, and the mixture was again refluxed at 119–120° C. for 20 minutes. The starting material dissolved completely, giving a dark brown solution. The reaction mixture was vacuum-distilled to dryness and the residue dissolved in 500 milliliters of ethyl ether on which it was allowed to stand for 30 minutes. The solution was filtered and the filtrate diluted with 470 milliliters of pentane. This mixture was treated with decolorizing carbon, filtered, and vacuum-distilled to give 56.7 grams of dark sirupy product, corresponding to a yield of 91.7 percent of the theoretical.

Analysis: N
Calculated _____ 5.94
Found _____ 5.94

The chloro oximes of the present invention are useful as bactericides and soil fungicides. Substantially complete control of fungi may be effected by applying the compounds of this invention to the infected soil in concentrations of from 50 to 300 pounds per acre. When used as fungicides, the chloro oxime compounds of this invention are conveniently formulated by dissolving in acetone, adding a suitable emulsifier, and diluting with water to give a formulation containing from about 1000 to about 2000 parts of compound per million parts of formulation. The thus-prepared formulation is applied to the soil by suitable spray equipment. When used as bactericides, the chloro oxime compounds of this invention can be formulated similarly by dissolving in acetone, adding a suitable emulsifier, and diluting with water to give a formulation containing, for example, from about 100 to about 500 parts of compound per million parts of formulation. The formulation is applied to the bacteria to be destroyed by means known in the art.

The following tests were carried out to determine the bactericidal and fungicidal activity of compounds representative of this invention.

The following compounds were tested:

Compound No. 1—3-chlorobicyclo(2.2.1)heptan-2-one oxime

Compound No. 2—3-chloro-5(6)-chloromethylbicyclo (2.2.1)heptan-2-one oxime

Compound No. 3—3-chloro-5(6)-phenylbicyclo(2.2.1) heptan-2-one oxime

Compound No. 4—3-chloro-5,5(6,6)-dimethylbicyclo (2.2.1)heptan-2-one oxime

Compound No. 5—3-chloro-5(6)-methylmercapto-bicyclo(2.2.1)heptan-one oxime

Compound No. 6—3-chloro-5(6)-methoxybicyclo(2.2.1) heptan-one oxime

In the following series of tests, suspensions of Compounds 1–6 were prepared by dissolving one gram of compound in 50 milliliters of acetone in which had been dissolved 0.1 gram (10 percent of the weight of the compound) of "Triton X–155," an alkylphenoxy polyethoxyethanol surfactant, as an emulsifying or dispersing agent. The resulting solution was mixed into 200 milliliters of water to give roughly 250 milliliters of a suspension containing the compound in finely divided form. The thus-prepared stock suspension contained 0.4 percent by weight of compound. The test concentrations employed in the tests described hereinbelow were obtained by diluting the stock suspension with water.

FUNGICIDE TESTS

In one series of tests, the test organism was Pythium sp., infesting artifically inoculated soil in two 4-inch clay pots. The test compound was formulated by diluting the stock suspension with water to give a test suspension containing 1000 parts of compound per million parts of suspension. Each of the clay pots was drenched with 75 ml. of this test suspension at a concentration corresponding to 150 pounds per acre. The thus-treated pots were covered with aluminum foil, to prevent drying of the soil, and incubated for two days at room temperature. The soil in each pot was then seeded with 15 peas as an indicator crop, and the pots were removed to the green house. 15 days after planting a count was made of the number of germinated seedlings per pot. The compounds were rated according to their ability to inhibit fungi growth, as evidenced by germination of seedlings in treated pots. The following designations were used.

5=90–100 percent germination
4=70– 89 percent germination
3=50– 69 percent germination
2=25– 49 percent germination
1= 0– 24 percent germination A control pot treated with a water suspension containing acetone and emulsifier but no compound, showed only 0–10 percent germination.

In a second series of tests, the test organism was Fusarium gladiola, cultured on potato dextrose agar at 20° C. and pH 4.5–5.5. The test medium was dextrose agar, prepared by dissolving 45 grams of Difco potato dextrose agar and 5 grams of Difco Bacto agar in 1000 milliliters of hot water, measuring 18 milliliter aliquots into 50-milliliter Erlenmayer flasks, allowing these aliquots to solidify, and sterilizing by autoclaving for 20 minutes. The test compound of this invention was formulated by diluting the stock suspension with water to give a test suspension containing 1000 parts of test compound per million parts of suspension. This test suspension was incorporated into the test medium aliquots described above by melting the test medium aliquots and cooling to 50–60° C., adding 2 milliliters of test formulation to each 18-milliliter test medium aliquot, agitating well to insure uniform mixing, and pouring the mixture into sterilized petri dishes, where it was allowed to solidify. Thus the concentration of test compound in the agar test medium was 100 parts per million. A colony of test organism was transferred from the main culture to a test tube two weeks before use as a test culture. When ready to test, 10 milliliters of sterilized 1 percent "Tween 20," a non-ionic polyoxyalkylene derivative surfactant, solution were added to the test tube. The surface of the test organism colony was rubbed gently with a transfer loop to form a suspension of test organism in the "Tween 20" solution. After agitating this suspension thoroughly, a transfer loop, heated to red heat and allowed to cool, was dipped into the suspension and transferred to the agar test medium, where the quantity of suspension adhering to the loop was streaked onto the surface of the agar. The thus-inoculated petri dishes were incubated for five days at 20° C. The incubated dishes were examined and each compound was rated according to its ability to inhibit growth of fungi using the following designations:

5=no growth of fungi
4=slight growth of fungi
3=moderate growth of fungi
2=heavy growth of fungi A control test, identical to the above-described test except that the addition of test compound was omitted, showed extensive growth of fungi.

BACTERICIDE TESTS

In a third series of tests, the test organism was Escherichia coli, and in a fourth series of tests, the test organism was Micrococcus pyogenes var. aureus. The test organisms were cultured on nutrient agar at controlled conditions of 20° C. and pH 7.0. For each compound in each series of tests, a one-half milliliter portion of the bacteria culture was added to a test tube containing a 2-milliliter portion of test compound suspension formulated by diluting the stock suspension with water to give a test compound suspension containing 250 parts of test compound per million parts of suspension. The test tube containing bacteria culture and test suspension was covered and allowed to stand at 20° C. for twenty-four hours. After the twenty-four hour period a loopful of the tube contents was transferred aseptically to a test tube containing an 8 milliliter aliquot of a nutrient broth prepared by dissolving 8 grams of dehydrated Bacto nutrient broth in 1000 milliliters of distilled water. The test tube containing the nutrient broth aliquots had been sterilized by plugging and autoclaving for 20 minutes at 15 p.s.i.g. prior to introduction of the bacteria culture/test suspension mixture. The inoculated broth tubes were incubated at 20° C. for 48 hours. The ability of a compound to inhibit bacterial growth was visually rated, using the following designations.

5=no growth of bacteria
3=slight to moderate growth of bacteria
1=severe growth of bacteria A control test showed severe growth of bacteria.

The results of the four above-described series of tests are set forth in Table I, following.

TABLE I

| Compound | Biological evaluation | | | |
| --- | --- | --- | --- | --- |
| | Fungicidal | | Bactericidal | |
| | Pythium sp. | Fusarium gladiola | Escherichia Coli | Micrococcus Pyogenes |
| 1 | 5 | 5 | | |
| 2 | 4 | 4 | 5 | 5 |
| 3 | 3 | 3 | 5 | |
| 4 | 5 | 5 | 5 | 5 |
| 5 | 4 | | 5 | |
| 6 | | | 3 | 5 |

What is claimed is:

1. Compounds of the formula

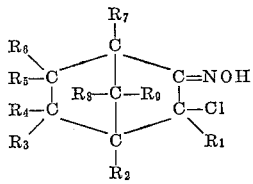

wherein $R_1$, $R_2$, $R_4$, $R_6$, $R_7$, $R_8$, and $R_9$ are selected from the group consisting of hydrogen and lower alkyl radicals; and $R_3$ and $R_5$ are selected from the group consisting of hydrogen phenyl radicals, lower alkylmercapto radicals, and lower alkoxy radicals, with the proviso that one of $R_3$ and $R_5$ must be hydrogen and the other one must be other than hydrogen.

2. 3-chloro-5(6)-phenylbicyclo(2.2.1)heptan-2-one oxime.

3. 3-chloro-5(6)-methylmercaptobicyclo(2.2.1)heptan-2-one oxime.

4. 3-chloro-5(6)-methoxybicyclo(2.2.1)heptan-2-one oxime.

References Cited by the Examiner
UNITED STATES PATENTS

| | | | |
| --- | --- | --- | --- |
| 2,419,976 | 5/47 | Trepagnier et al. | 260—647 |
| 2,442,854 | 6/48 | Leffler et al. | 260—566 |
| 2,619,504 | 11/52 | Bibb et al. | 260—587 |
| 2,882,318 | 4/59 | Kundiger et al. | 260—566 |
| 2,949,490 | 8/60 | Pieper et al. | 260—647 |

OTHER REFERENCES

Beckman et al., Ber. Deut. Chem., vol. 88, pp. 1703–1706 (1955).

Beilstein, "Handbach der Organischen Chemie," vol. 7, pp. 118, 119 (1925).

Elsevier, "Encyclopedia of Organic Chemistry," vol. 12A, pp. 790 to 813 (1948).

Komppa et al., Ann. der Chem., vol. 497, pp. 116–130 (1932).

Komppa et al., Ann. der Chem., vol. 512, pp. 172–185 (1934).

Niskikawa, C. A., vol. 49, p. 1596 (1955).

Quist, Ann. der Chem., vol. 417, pp. 279–324 (1918).

CHARLES B. PARKER, *Primary Examiner.*

LEON ZITVER, *Examiner.*